(12) United States Patent
Wakui

(10) Patent No.: US 9,259,940 B2
(45) Date of Patent: Feb. 16, 2016

(54) IMAGE FORMATION DEVICE, METHOD AND PROGRAM

(71) Applicant: FUJIFILM CORPORATION, Tokyo (JP)

(72) Inventor: Takashi Wakui, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/806,658

(22) Filed: Jul. 23, 2015

(65) Prior Publication Data

US 2015/0321484 A1 Nov. 12, 2015

Related U.S. Application Data

(63) Continuation of application No. PCT/JP2014/051133, filed on Jan. 21, 2014.

(30) Foreign Application Priority Data

Feb. 4, 2013 (JP) ................................. 2013-019774

(51) Int. Cl.
  *B41J 2/205* (2006.01)
  *B41J 2/21* (2006.01)
(52) U.S. Cl.
  CPC .............. *B41J 2/2121* (2013.01); *B41J 2/2054* (2013.01)

(58) Field of Classification Search
  CPC .......... B41J 2/01; B41J 2/2054; B41J 2/2132; B41J 2/2121; B41J 11/002; B41J 2/21; B41J 2/2114; H04N 1/40087
  See application file for complete search history.

(56) References Cited

U.S. PATENT DOCUMENTS 7,742,195 B2 * 6/2010 Kakutani ............. H04N 1/4105
                                                              358/3.09

FOREIGN PATENT DOCUMENTS

JP           4375050           12/2009

\* cited by examiner

*Primary Examiner* — Thinh Nguyen
(74) *Attorney, Agent, or Firm* — Jianq Chyun IP Office

(57) ABSTRACT

There are provided an image formation device, method, and program capable of forming an image, which is appropriate for a combination of dot sizes, with high flexibility in design for optimizing halftone processing in a case of using a plurality of dot sizes. Two or more combinations are selected among combinations of a plurality of types of threshold matrix and at least one type of division information for classifying a whole range of threshold values covered by the types of threshold matrix into a plurality of divisions. Then, by respectively applying the two or more combinations, dot sizes of pixels are determined on the basis of assigned two or more code values.

16 Claims, 11 Drawing Sheets

| TYPE OF THRESHOLD MATRIX | M1 | | | M2 | | | M3 | |
|---|---|---|---|---|---|---|---|---|
| TYPE OF DIVISION INFORMATION | P1 | | | P2 | | | P3 | |
| DIVISION ATTRIBUTE | a | b | c | a | b | c | a | b |
| BIT NUMBER | 0 | 1 | 2 | 3 | 4 | 5 | 6 | 7 |
| | | | | | | | — | — |

72

70

IMAGE FORMATION DEVICE, METHOD AND PROGRAM

CROSS REFERENCE TO RELATED APPLICATIONS

This application is a Continuation of PCT International Application No. PCT/JP2014/051133 filed on Jan. 21, 2014, which claims priority under 35 U.S.C §119(a) to Japanese Patent Application No. 2013-019774 filed on Feb. 4, 2013, all of which are hereby expressly incorporated by reference into the present application.

BACKGROUND OF THE INVENTION

1. Field of the Invention

The present invention relates to an image formation device, method, and program for forming an image which is formed of dots with a plurality of dot sizes.

2. Description of the Related Art

In recent years, with the rapid progress of an ink jet technique, color and large size printing, in which high speed and high image quality are compatible, has been realized by ink-jet-type image formation devices. This kind of device is used for, particularly, a wide field in application to signs and display, and is also applicable to printing of, for example, a storefront point of purchase (POP), wall poster, outdoor advertising, a signboard, and the like.

In this ink jet type, liquid droplets of a plurality of types of ink (for example, CMYK inks) are ejected onto a recording medium so as to form a plurality of dots, thereby obtaining printed matter. For example, when an image is formed using dots with different sizes, there have been proposed various halftoning techniques in which an increase in image quality and reduction in calculation processing amount are compatible.

JP4375050B (claim 1, [0152] to [0155], FIG. 26, etc.) has proposed a method of determining dot sizes for pixels turned on in accordance with sizes of threshold values at positions corresponding to the pixels from the results of binarization processing using threshold matrices. More specifically, there has been proposed a method of sequentially allocating larger dot sizes in an ascending order of threshold value (order value) when the number of large-size dots, the number of middle-size dots, and the number of small-size dots are specified.

SUMMARY OF THE INVENTION

However, according to the technique described in JP4375050B (claim 1, [0152] to [0155], FIG. 26, etc.), the dot sizes are allocated in accordance with the array of the threshold values, and therefore there is a tendency to obtain a dot image greatly dependent on characteristics of the threshold matrix. That is, distribution characteristics of the dots substantially depend on the type of the threshold matrix provided in this processing, and thus there was a problem that flexibility in design for optimizing halftone processing is low.

The present invention has been made in order to solve the above-described problem, and its object is to provide an image formation device, method, and program capable of forming an image, which is appropriate for a combination of dot sizes, with high flexibility in design for optimizing halftone processing in a case of using a plurality of dot sizes.

According to the present invention, there is provided an image formation device that forms an image which is formed of dots with a plurality of dot sizes, the image formation device including: a combination selection portion that selects two or more combinations among combinations of a plurality of types of threshold matrix for performing binarization processing on a continuous tone image signal and at least one type of division information for classifying a whole range of threshold values covered by the types of threshold matrix into a plurality of divisions; a code assigning portion that respectively assigns code values, which are based on whether or not pixels of the continuous tone image signal belong to the plurality of divisions, to the two or more combinations; and a dot size determination portion that determines the dot sizes of the respective pixels on the basis of the two or more code values respectively corresponding to the two or more combinations.

As described above, there are provided: the combination selection portion that selects two or more combinations among the combinations of the plurality of types of threshold matrix and at least one type of division information for classifying the whole range of the threshold values covered by the types of threshold matrix into the plurality of divisions; and the dot size determination portion that determines the dot sizes of the pixels on the basis of the assigned two or more code values by respectively applying the two or more combinations. Therefore, it is possible to achieve distribution characteristics of dots in which two or more different dithering properties are made to be compatible, and flexibility in design for optimizing halftone processing in a case of using the plurality of dot sizes becomes high. Thereby, it is possible to form an image appropriate for the combination of the dot sizes.

Further, it is preferable that the image formation device further includes a data storage portion that stores size correspondence information which indicates a correspondence relationship between the dot sizes and the combination codes in which the two or more code values are combined in accordance with combination rules, in which the dot size determination portion generates the combination codes, and determines the dot sizes by referring to the size correspondence information which is stored by the data storage portion.

Furthermore, it is preferable that the combination selection portion selects the two or more combinations in accordance with a gray level indicated by the continuous tone image signal.

In addition, it is preferable that the combination selection portion selects two or more types of threshold matrix, which have the same matrix size, as combinations.

Further, it is preferable that the combination selection portion selects two or more types of threshold matrix, which have the same arrangement in a part of a range of the threshold values, as combinations.

Furthermore, it is preferable that the image formation device further includes: a recording head that forms dots with a plurality of dot sizes on a recording medium; and a head driving circuit that controls the recording head such that the recording head sequentially forms the dots, on the basis of a control signal corresponding to the dot sizes determined by the dot size determination portion, under a condition where the recording medium is moved relative to the recording head.

According to the present invention, there is provided an image formation method for using an image formation device that forms an image which is formed of dots with a plurality of dot sizes, the image formation method including: selecting two or more combinations among combinations of a plurality of types of threshold matrix for performing binarization processing on a continuous tone image signal and at least one type of division information for classifying a whole range of threshold values covered by the types of threshold matrix into a plurality of divisions; assigning respectively code values, which are based on whether or not pixels of the continuous tone image signal belong to the plurality of divisions, to the two or more combinations; and determining the dot sizes of the respective pixels on the basis of the two or more code values respectively corresponding to the two or more combinations.

According to the present invention, there is provided a program for causing an image formation device, which forms an image formed of dots with a plurality of dot sizes, to execute: selecting two or more combinations among combinations of a plurality of types of threshold matrix for performing binarization processing on a continuous tone image signal and at least one type of division information for classifying a whole range of threshold values covered by the types of threshold matrix into a plurality of divisions; assigning respectively code values, which are based on whether or not pixels of the continuous tone image signal belong to the plurality of divisions, to the two or more combinations; and determining the dot sizes of the respective pixels on the basis of the two or more code values respectively corresponding to the two or more combinations.

According to the image formation device, method, and program of the present invention, the two or more combinations are selected among the combinations of the plurality of types of threshold matrix for performing the binarization processing on the continuous tone image signal and at least one type of division information for classifying the whole range of the threshold values covered by the types of threshold matrix into the plurality of divisions, and the dot sizes of the respective pixels are determined on the basis of the two or more code values respectively corresponding to the two or more combinations. Therefore, it is possible to achieve distribution characteristics of dots in which two or more different dithering properties are made to be compatible, and flexibility in design for optimizing halftone processing in a case of using the plurality of dot sizes becomes high. Thereby, it is possible to form an image appropriate for the combination of the dot sizes.

BRIEF DESCRIPTION OF THE DRAWINGS

FIG. 5 is a second explanatory diagram of the halftone processing prescribed by the systematic dithering method.

FIG. 7 is a schematic explanatory diagram of a method of generating combination codes.

DESCRIPTION OF THE PREFERRED EMBODIMENTS

Hereinafter, an embodiment of an image formation method according to the present invention, which is remarkably suitable in terms of a relationship between an image formation device and a program for performing the method, will be described with reference to the accompanying drawings. In this specification, to form an image is referred to as "printing" in some cases.

[Configuration and Operation of Image Processing Section 10]

Figure 1:
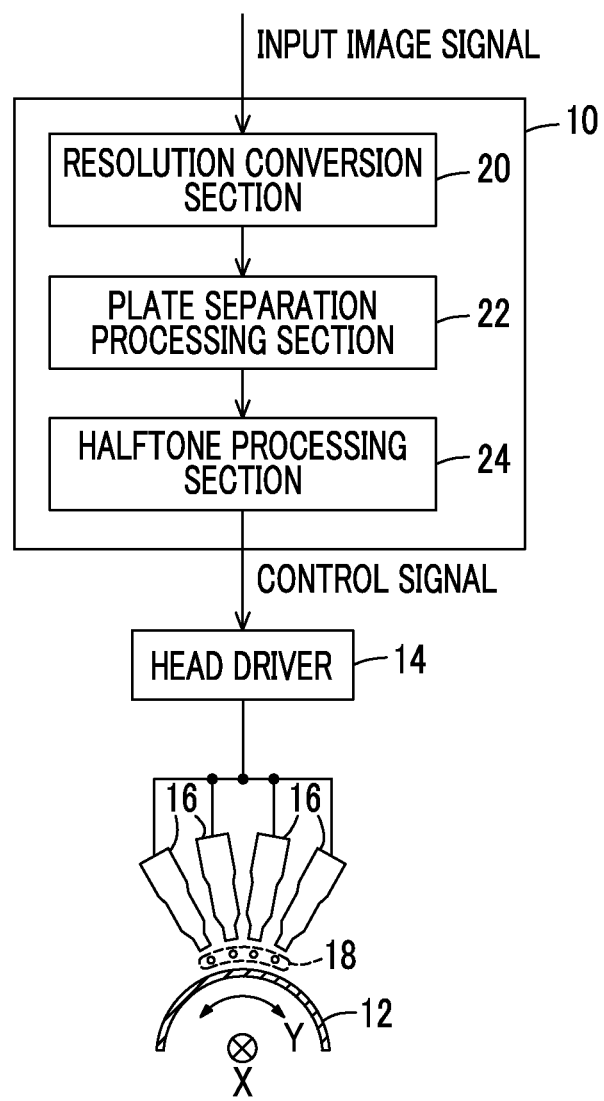
FIG. 1 is a schematic block diagram illustrating a main configuration for implementing an image formation method according to an embodiment.

FIG. 1 is a schematic block diagram illustrating a main configuration for implementing an image formation method according to this embodiment.

An image processing section 10 as a main section of the present invention generates a control signal for forming a color image or a monochrome image, which is formed of a plurality of dots, on a sheet 12 (recording medium), and supplies the control signal to a head driver 14 (head driving circuit) side. The control signal corresponds to a signal for causing at least one (four in this example of the drawing) recording heads 16 to eject liquid droplets 18.

Here, each recording head 16 is able to form dots with a plurality of sizes (hereinafter referred to as dot sizes) on the sheet 12. Examples of methods of controlling the dot sizes include a method of controlling an ejection amount of liquid droplets 18 and a method of controlling an ejection speed of liquid droplets 18. For example, by increasing the ejection amount while keeping the ejection speed of liquid droplets 18 constant, it is possible to increase diameters of the dot sizes. Hereinafter, in this embodiment, description will be given on the premise that each recording head 16 is able to form dots with three kinds of dot size of a "large size" a "middle size", and a "small size".

The image processing section 10 basically includes a resolution conversion section 20, a plate separation processing section 22, and a halftone processing section 24. Hereinafter, an operation of the image processing section 10 will be schematically described. Here, an image signal (hereinafter referred to as an input image signal), which is input to the image processing section 10, is continuous tone data formed of a plurality of color channels. The input image signal may be, for example, 8-bit (256 gray levels per one pixel) RGB TIFF format data.

<1. Description of Operation of Resolution Conversion Section 20>

The resolution conversion section 20 converts a resolution of the input image signal into a resolution for an image formation device 100 (FIGS. 10 and 11) through image scaling processing to enlarge or reduce the image size. A first intermediate image signal, which is obtained at this time, has the same data definition as that of the input image signal, but the data sizes are different therebetween. Various well-known algorithms including interpolation calculation may be applied to the image scaling processing.

<2. Description of Operation of Plate Separation Processing Section 22>

The plate separation processing section 22 converts the first intermediate image signal, which is acquired from the resolution conversion section 20, into a device color signal which is compatible with the image formation device 100. Specifically, the plate separation processing section 22 reads and refers to one of the plurality of stored plate separation tables, thereby converting a RGB color signal into a CMYK color signal. When the plate separation tables include shading tables for separating a deep color and a light color, the plate separation processing section 22 further divides (separates) the device color signal for a specific color channel (for example, cyan, magenta) into a signal for a color channel of a color similar thereto.

A second intermediate image signal, which is obtained at this time, corresponds to a device color signal (a continuous tone image signal; refer to FIG. 2) with continuous tone. For example, the second intermediate image signal is separated into device color signals for four color channels of yellow (Y), magenta (M), cyan (C), and black (K).

<3. Description of Operation of Halftone Processing Section 24>

The halftone processing section 24 converts the second intermediate image signal, which is acquired from the plate separation processing section 22, into a dot image signal which indicates dot states. The dot image signal is multi-value data for each color for chronologically controlling the ejection amount of liquid droplets 18 or execution (on or off) of the ejection operation. For example, a multi-value level "0" indicates an off-state, a multi-value level "1" indicates an on-state (small size), a multi-value level "2" indicates an on-state (middle size), and a multi-value level "3" indicates an on-state (large size).

Thereafter, the image processing section 10 completes the entire desired image processing so as to generate a control signal, and subsequently the control signal is supplied to the head driver 14 side. Then, each recording head 16 ejects liquid droplets 18 in accordance with ejection control through the head driver 14. By sequentially transporting the sheets 12 in a direction of an arrow Y in accordance with the ejection operation, a desired image is formed on the sheet 12.

[Configuration of Halftone Processing Section 24]

Figure 2:
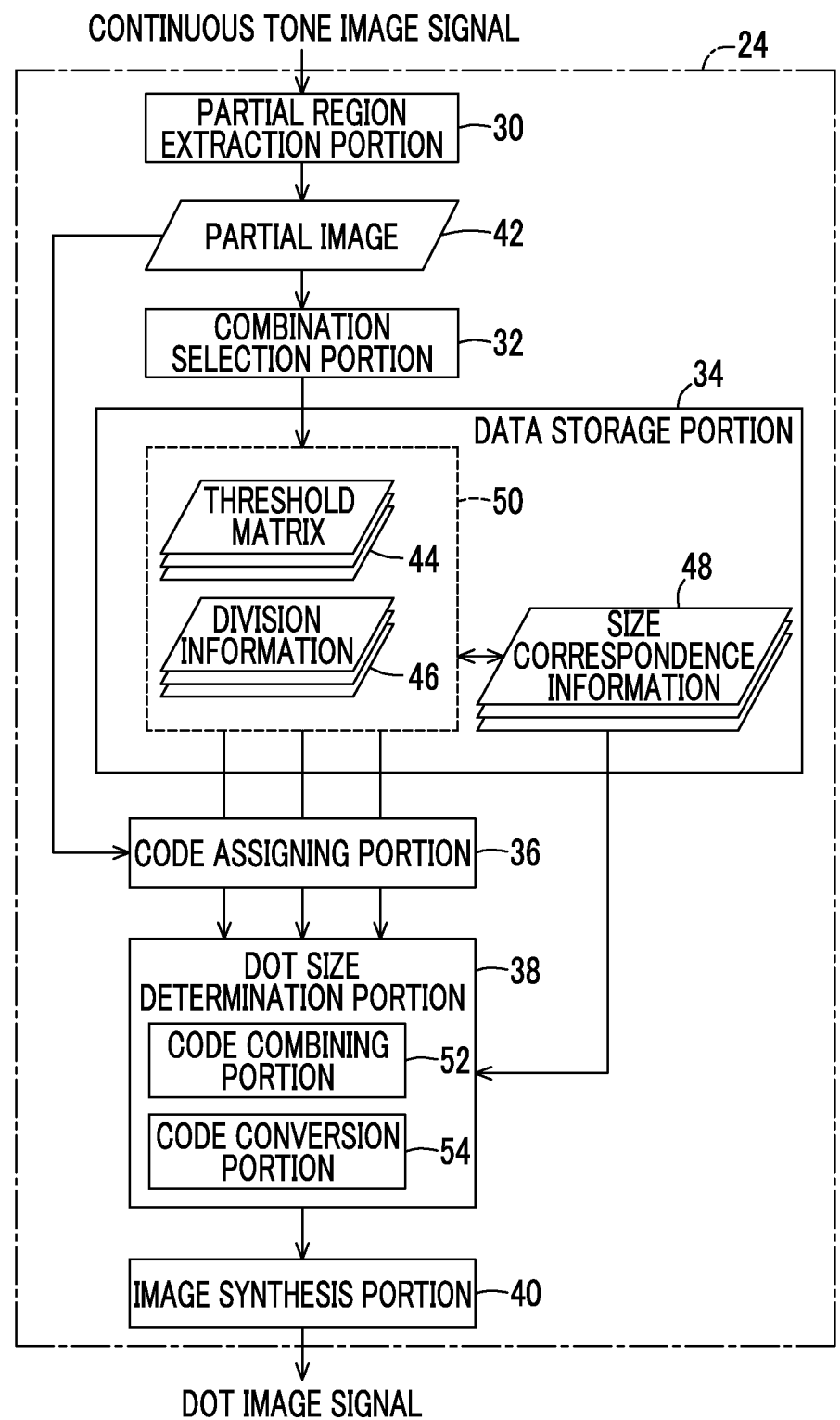
FIG. 2 is a functional block diagram of a halftone processing section illustrated in FIG. 1.

FIG. 2 is a functional block diagram of a halftone processing section 24 illustrated in FIG. 1. The halftone processing section 24 includes a partial region extraction portion 30, a combination selection portion 32, a data storage portion 34, a code assigning portion 36, a dot size determination portion 38, and an image synthesis portion 40.

The partial region extraction portion 30 sequentially extracts partial regions 66 (FIG. 4B) which are parts of an image region 62 (the same drawing) indicated by the continuous tone image signal. Then, the partial region extraction portion 30 respectively supplies partial images 42, which indicate the partial regions 66, to the combination selection portion 32 and the code assigning portion 36. The code assigning portion 36 assigns code values to the respective pixels, which are included in the continuous tone image signal, on the basis of division information.

The data storage portion 34 respectively stores a plurality of types of threshold matrix 44, one type or a plurality of types of division information 46, and a plurality of pieces size correspondence information 48. Hereinafter, in some cases, the threshold matrices 44 and the division information 46 are collectively referred to as an encoding data group 50. The threshold matrices 44 are used in order to perform binarization processing on the continuous tone image signal.

The dot size determination portion 38 includes a code combining portion 52 that combines the assigned two or more code values so as to generate combination codes, and a code conversion portion 54 that converts the combination codes generated by the code combining portion 52 into dot sizes.

[Operation of Halftone Processing Section 24]

Subsequently, an operation of the halftone processing section 24 of FIGS. 1 and 2 will be described in detail mainly with reference to the flowchart of FIG. 3.

Figures 4A, 4B:
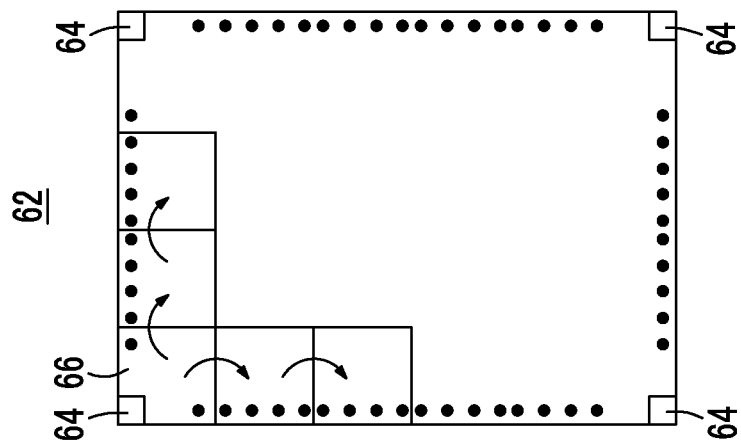
FIG. 4A is a schematic diagram illustrating threshold values of a threshold matrix.
FIG. 4B is a first explanatory diagram of the halftone processing prescribed by a systematic dithering method.

FIG. 4A is a schematic diagram illustrating threshold values of the threshold matrix 44. The threshold matrix 44 is formed of a total of 25 matrix elements 60 arranged in a matrix of 5×5 in the row and column directions. The threshold value of each matrix element 60 is any of integers in a range of "1 to 25", and is a value which is unique in the range. Consequently, by applying a systematic dithering method using the threshold matrix 44 on the continuous tone image signal, 26 gray levels can be represented.

FIG. 4B is a first explanatory diagram of the halftone processing prescribed by a systematic dithering method. In the image region 62 having a rectangular shape, a plurality of pixels 64 is two-dimensionally disposed. In this embodiment, the threshold matrices 44 are sequentially applied to the continuous tone image signal having the image region 62, thereby executing halftone processing.

Figure 3:
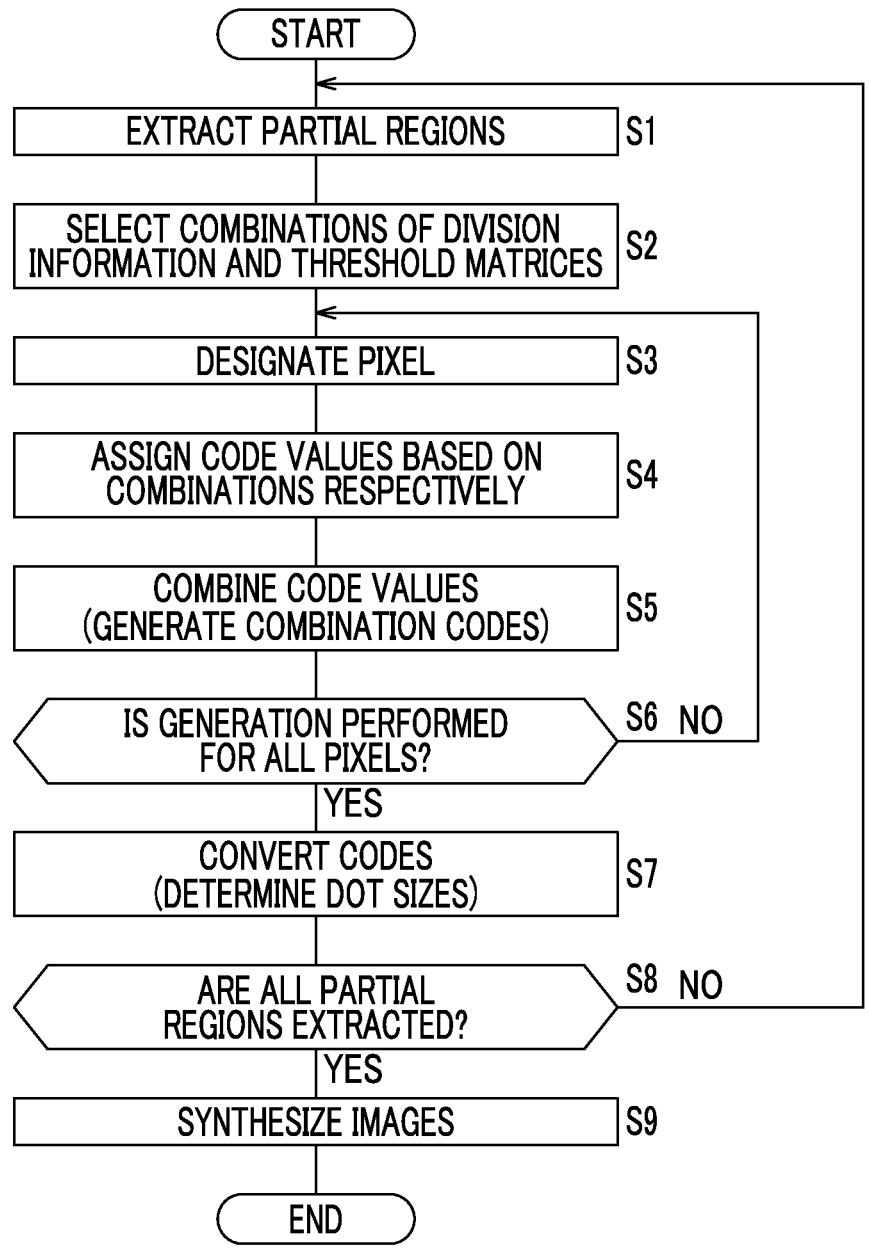
FIG. 3 is a flowchart that is provided for description of an operation of the halftone processing illustrated in FIG. 2.

In step S1 of FIG. 3, the partial region extraction portion 30 extracts partial regions 66 (refer to FIG. 4B) which are parts of an image region 62 (the same drawing) indicated by the continuous tone image signal. A size of the partial region 66 is the same as the size of each threshold matrix 44.

In step S2, the combination selection portion 32 selects at least two combinations in the encoding data group 50. The combinations include at least two types of threshold matrix 44. Here, it is assumed that three combinations are selected. Hereinafter, the "M1" threshold matrix 44 and the "P1" division information 46 are referred to as a "first combination". Further, the "M2" threshold matrix 44 and the "P2" division information 46 are referred to as a "second combination". Furthermore, the "M3" threshold matrix 44 and the "P3" division information 46 are referred to as a "third combination".

In addition, the combination selection portion 32 may select two or more combinations in response to the gray level indicated by the partial image 42 (continuous tone image signal). The gray level is specified on the basis of a statistical amount for pixel values of the plurality of pixels 64 and/or a pixel value of one pixel 64 present in the partial region 66. Here, in order to increase randomness, pseudo noise may be added to the gray level.

Further, the combination selection portion 32 may select two or more types of threshold matrix 44, which have different dot distribution characteristics, as combinations. Here, the "dot distribution characteristics" are defined as characteristics of two-dimensional distribution of arranged dots, more specifically, the characteristics including various characteristics such as density, phase, and spatial frequency characteristics. Further, the combination selection portion 32 may select two or more types of threshold matrix 44, which have the same arrangement in a partial range of the threshold values (for example, a dot percentage thereof corresponds to 50 to 100%), as combinations.

In step S3, the code assigning portion 36 designates a single pixel 64, which has not been yet designated, in each partial region 66 extracted in step S1. In an initial state, any one pixel 64 of 25 pixels is designated.

In step S4, the code assigning portion 36 respectively assigns the code values, which are based on the combinations selected in step S2, to the pixels 64 designated in step S3. Hereinafter, this assigning method will be described in detail with reference to FIGS. 5 to 6C.

[1] First, the code assigning portion 36 performs binarization processing using the threshold matrix 44 on the partial image 42. In the case of the first combination, the code assigning portion 36 acquires the "M1" threshold matrix 44 from the data storage portion 34.

Figure 5:
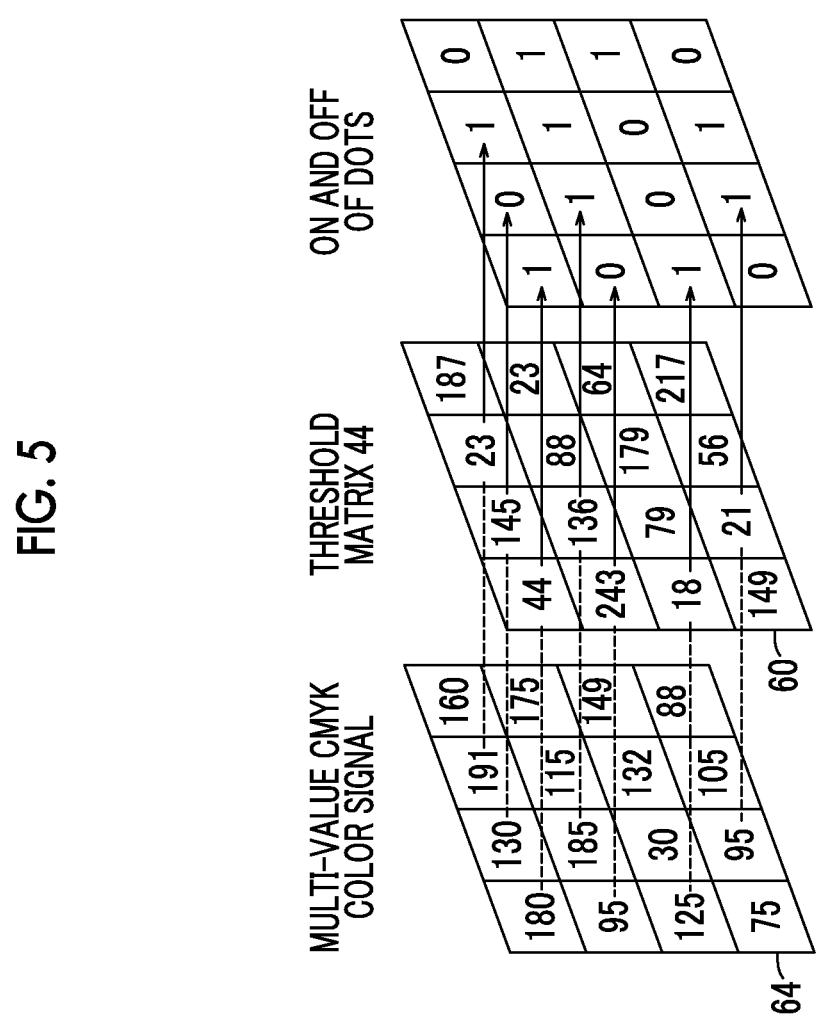

FIG. 5 is a second explanatory diagram of the halftone processing prescribed by the systematic dithering method. A concept of binarization using the threshold matrix 44 (mask pattern) having a Bayer array shape is illustrated as an example. Respective addresses in the continuous tone image signal are associated with the respective matrix elements 60 of the threshold matrix 44. Then, a pixel value of each target pixel 64 is compared with a threshold value of each target matrix element 60. If the pixel value is smaller than the threshold value, "0 (off-state)" is assigned to the pixel, otherwise "1 (on-state)" is assigned thereto. In such a manner, the number of gray levels of the image signal is converted from multiple values into binary values.

[2] Subsequently, the code assigning portion 36 determines whether or not the threshold values corresponding to the positions of the on-state pixels 64 belong to the plurality of divisions. The code assigning portion 36 determines which division each pixel 64 belongs to. Before this determination, the code assigning portion 36 acquires the "P1" division information 46 from the data storage portion 34 in the case of the first combination.

Here, the division information 46 is information for classifying the whole range of the threshold values covered by the threshold matrix 44 into the plurality of divisions. The division information 46 is defined as a set of boundary values (upper or lower limits) of divisions as an example. Specifically, when the set of boundary values is given as "9" and "21", the whole range of the threshold values is classified into three divisions. Hereinafter, classification results of the pixels 64, which are present in the partial region 66, will be described with reference to FIGS. 6A to 6C.

Figure 6A:
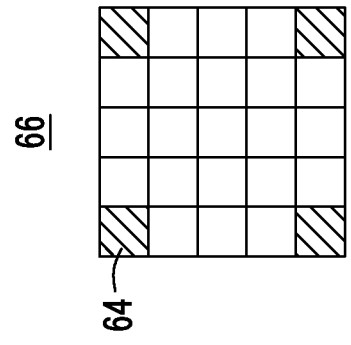
FIGS. 6A to 6C are schematic diagrams illustrating results of classifications of pixels which are present in a partial region.

As illustrated in FIG. 6A, the 9 hatched pixels 64 are classified as a single division (hereinafter referred to as a division "a"). As can be seen from the relationship between FIGS. 4A and 6A, all the threshold values of the matrix elements 60 are in the range of "1 to 9".

Figure 6B:
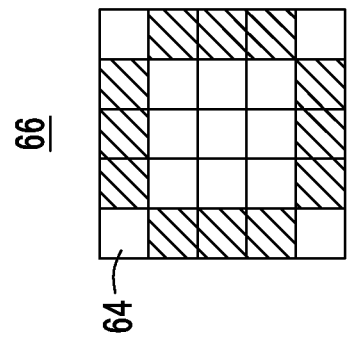

As illustrated in FIG. 6B, the 12 hatched pixels 64 are classified as a single division (hereinafter referred to as a division "b"). As can be seen from the relationship between FIGS. 4A and 6B, all the threshold values of the matrix elements 60 are in the range of "10 to 21".

Figure 6C:
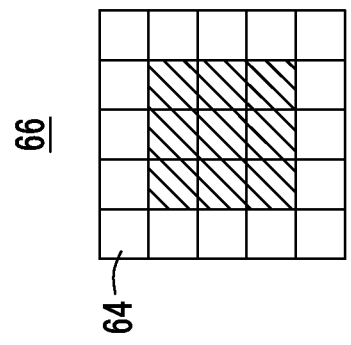

As illustrated in FIG. 6C, the 4 hatched pixels 64 are classified as a single division (hereinafter referred to as a division "c"). As can be seen from the relationship between FIGS. 4A and 6C, all the threshold values of the matrix elements 60 are in the range of "22 to 25".

[3] Finally, the code assigning portion 36 assigns a code value, which is capable of uniquely specifying whether or not the designated pixel 64 belongs to the three divisions, to the designated pixel 64. For example, whether or not the pixel belongs to the divisions is represented by 3-bit code values. The code values are "001" if the pixel belongs to the division "a", "010" if the pixel belongs to the division "b", and "100" if the pixel belongs to the division "c". In addition, a code value of the off-state pixel 64 is represented by "000".

Thereafter, in a similar manner to that of the first combination, by respectively applying the second and third combinations, the code assigning portion 36 respectively assigns code values which are defined as described above (step S4). In addition, the combination selection portion 32 combines and selects threshold matrices 44 of which matrix sizes are the same or different. In particular, the two or more types of threshold matrix 44 having the same matrix size may be combined and selected, whereby processing of extracting the partial regions 66 is completed when the processing is performed once, regardless of the total number of combinations. Therefore, this is preferable in view of calculation.

In step S5 of FIG. 3, the code combining portion 52 (dot size determination portion 38) combines at least two code values assigned in step S4, thereby generating combination codes.

FIG. 7 is a schematic explanatory diagram of a method of generating combination codes. As illustrated in the present drawing, in the case of the first combination, the divisions "a", "b", and "c" respectively correspond to bit numbers "0", "1", and "2". Further, in the case of the second combination, the divisions "a", "b", and "c" respectively correspond to bit numbers "3", "4", and "5". Furthermore, in the case of the third combination, the divisions "a" and "b" respectively correspond to bit numbers "6" and "7".

As described above, by combining three code values in accordance with a predetermined combination rule, 8-bit combination codes are generated. In a manner similar to the present drawing example, by omitting some of the code values, the number of bits of the combination code may be adjusted. As described above, when the number of bits of the combination code is set as an 8 bit number or the like which is an integer multiple of a specific unit number, this is advantageous in terms of data administration or calculation processing.

In step S6, the halftone processing section 24 determines whether or not combination codes have been generated for all the pixels 64 which are present in the partial region 66. If it is determined that the generation has not yet been completed (step S6: NO), the current process returns to step S3, and then the steps S3 to S5 are sequentially repeated. Thereby, the dot size determination portion (code combining portion 52) generates the combination codes for all the pixels 64 which are present in the partial region 66.

In contrast, if the halftone processing section 24 determines that the combination codes have been generated in all the pixels 64 which are present in the partial region 66 (step S6: YES), the current process advances to the following step (S7).

In step S7, the code conversion portion 54 (dot size determination portion 38) determines dot sizes of the pixels 64 on the basis of the combination codes which are generated in step S5 respectively. In this determination, the code conversion portion 54 selectively reads one of a plurality of pieces size correspondence information pieces 48 stored in the data storage portion 34. One size correspondence information piece 48 is selected in accordance with a result of selection from the encoding data group 50 or a gray level represented by the partial image 42.

Here, the size correspondence information 48 is a variety of information that indicates a correspondence relationship between the dot sizes and the combination codes in which the two or more code values are combined in accordance with the predetermined combination rule (refer to FIG. 7). That is, the code conversion portion 54 sequentially converts the combination codes into the dot sizes with reference to the size correspondence information 48, and determines the dot sizes of the pixels 64.

In step S8, the halftone processing section 24 determines whether or not all the partial regions 66 have been extracted from the image region 62. If it is determined that the extraction has not yet been completed (step S8: NO), the current process returns to step S1, and then the steps S1 to S7 are sequentially repeated. Thereby, the dot size determination portion 38 (code conversion portion 54) determines the dot sizes for all the pixels 64 which are present in the partial region 66.

In step S9, the image synthesis portion 40 synthesizes images which are sequentially obtained in step S7, thereby generating a dot image signal. Specifically, multi-value data pieces (for example, the gray levels are 0 to 3), which are associated with the dot states, are respectively disposed to maintain a positional relationship between the image region 62 and the partial regions 66 illustrated in FIG. 4B.

As described above, the halftone processing section 24 converts the continuous tone image signal into the dot image signal.

[Example of Processing Results]

Subsequently, processing results of the above-described image formation method will be described in detail.

Figure 8:
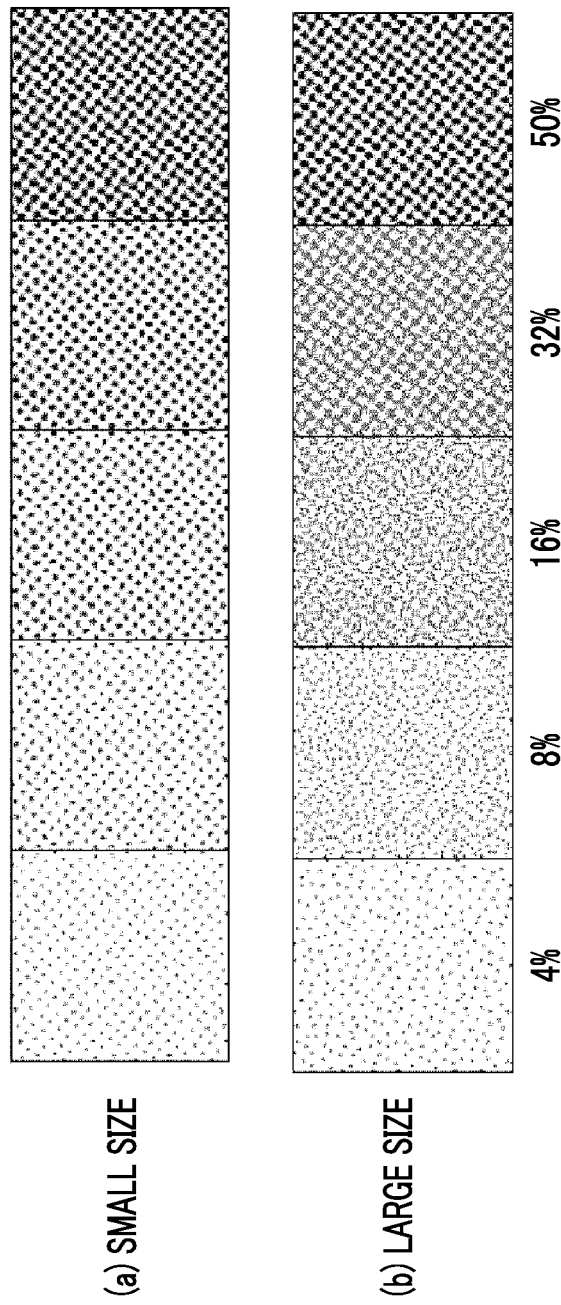
FIG. 8 is a schematic diagram visually illustrating dot patterns which are generated using different types of threshold matrix and correspond to gray levels.

FIG. 8 is a schematic diagram visually illustrating dot patterns which are generated using different types of threshold matrix 44 and correspond to gray levels. The gray levels (dot %) of the dot patterns are 4%, 8%, 16%, 32%, and 50% in order from the left side.

The upper side of the present drawing shows processing results using the threshold matrix 44 which is a dot aggregation type (typical AM dot). The lower side of the present drawing shows processing results using the threshold matrix 44 which is locally a dot dispersion type. In addition, in these threshold matrices 44, arrangement of the threshold values is the same in the range of the dot % of 50 to 100%. Therefore, the generated dot patterns are also the same.

Figure 9B:
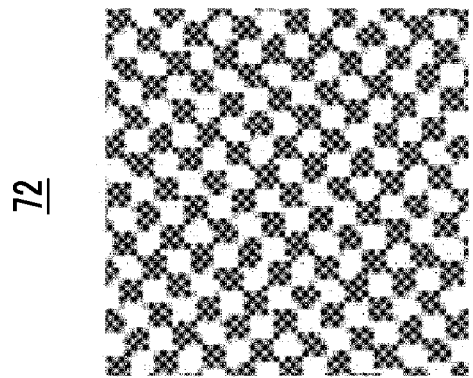
FIG. 9B is a schematic diagram of a dot image which is generated using two types of threshold matrix.
Figure 9A:
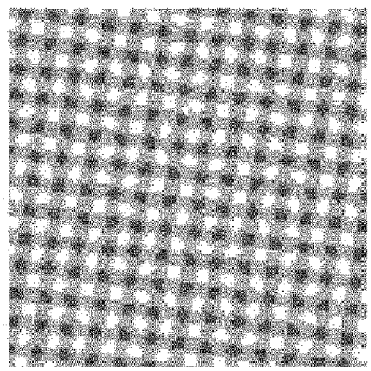
FIG. 9A is a schematic diagram of a dot image which is generated using a dot-aggregation-type threshold matrix.

FIG. 9A is a schematic diagram of a dot image 70 which is generated using a dot-aggregation-type threshold matrix 44. Here, the dot sizes are of two kinds (the large size and the small size), where the deep color portions indicate the "large size", the light color portions indicate the "small size", and the non-printed (white) portions indicate the "off-state". As described above, by using the dot-aggregation-type threshold matrix 44, the dot sizes are assigned on the basis of array of the threshold values. Therefore, it is possible to obtain the dot image 70 in which both of the "large size" and "small size" dots are disposed to be aggregated.

FIG. 9B is a schematic diagram of a dot image 72 which is generated using two types of threshold matrix 44. In a manner similar to FIG. 9A, the dot sizes are of two kinds (the large size and the small size), where the deep color portions indicate the "large size", the light color portions indicate the "small size", and the non-printed (white) portions indicate the "off-state".

As can be seen from the present drawing, it is possible to obtain the dot image 72 in which both of the "large size" and "small size" dots are disposed to be aggregated in a macro view, and the "large size" dots are disposed to be distributed in a micro view. As described above, it is possible to achieve distribution characteristics of dots in which two or more different dithering properties are made to be compatible.

[Effect of Image Processing Method]

As described above, the halftone processing section 24 includes the combination selection portion 32 that selects two or more combinations among combinations of the plurality of types of threshold matrix 44 and at least one type of division information 46 for classifying the whole range of threshold values covered by the types of threshold matrix 44 into the plurality of divisions; the code assigning portion 36 that respectively assigns code values, which are based on whether or not the threshold values corresponding to the positions of the pixels 64 belong to the plurality of divisions, to the pixels 64 which are turned on by performing binarization processing using the threshold matrices 44 on the continuous tone image signal; and the dot size determination portion 38 that determines dot sizes of pixels 64 on the basis of the assigned two or more code values by respectively applying the selected two or more combinations.

As described above, there are provided: the combination selection portion 32 that selects two or more combinations among combinations of the plurality of types of threshold matrix 44 and at least one type of division information 46 for classifying the whole range of threshold values covered by the types of threshold matrix 44 into the plurality of divisions; and the dot size determination portion 38 that determines dot sizes of pixels 64 on the basis of the assigned two or more code values by respectively applying the selected two or more combinations. Therefore, it is possible to achieve distribution characteristics of dots in which two or more different dithering properties are made to be compatible, and flexibility in design for optimizing halftone processing in a case of using the plurality of dot sizes becomes high. Thereby, it is possible to form an image appropriate for the combination of the dot sizes.

Modification Examples (1) In the above-described embodiment, the dot sizes are of three kinds, but the present invention is not limited to this, and the dot sizes may be of two kinds or four or more kinds.

(2) In the above-described embodiment, color plates of CMYK or the like are not particularly described, and this difference may be taken into account. For example, the combinations and the kinds of the division information 46 and the threshold matrices 44 may be selected to be the same as described above without using the color plates, and may be selected to be different for each color plate.

(3) In the above-described embodiment, the dot size determination portion 38 combines the assigned two or more code values in accordance with the predetermined combination rule, and determines the dot sizes with reference to the stored size correspondence information 48. However, the code values may be used without being combined. For example, when it is possible to obtain a result in which the dot sizes compete against each other in each code value, the dot size determination portion 38 may determine the dot sizes in accordance with a predetermined logic rule (for example, winner-takes-all method or a method of prioritizing larger dot sizes).

[Configuration of Image Formation Device 100]

Figure 10:
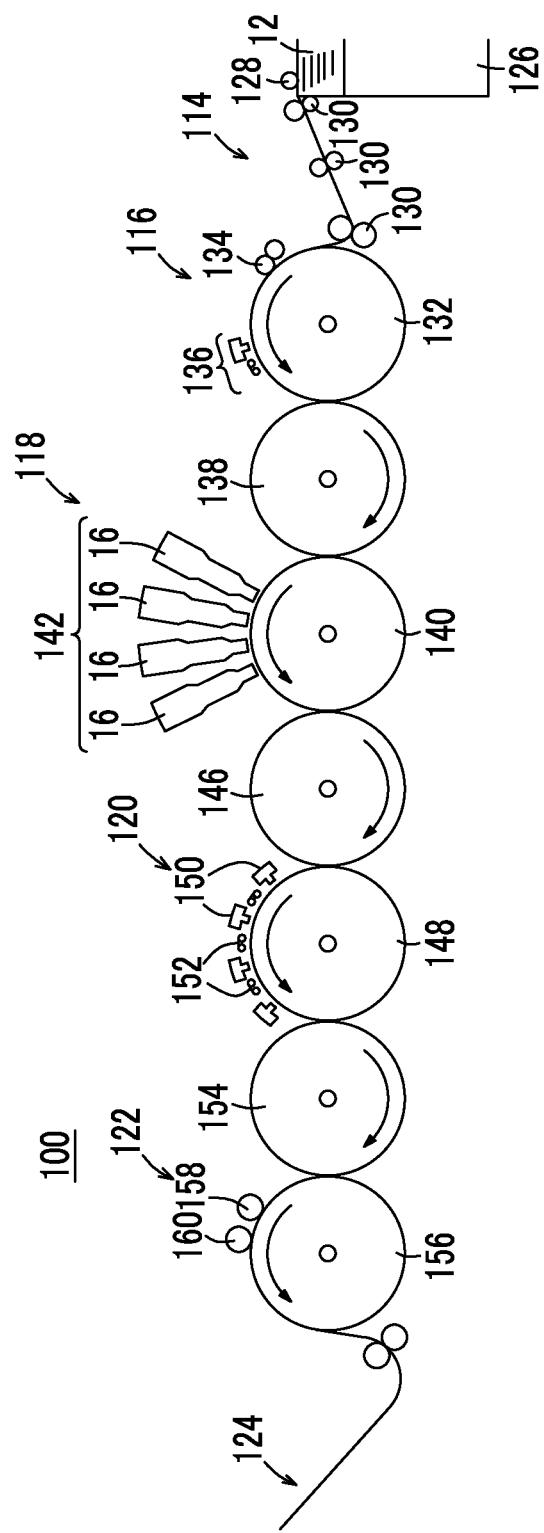
FIG. 10 is a cross-sectional side view illustrating a configuration of an image formation device.

Subsequently, a description will be given of the image formation device 100 capable of implementing the image formation method according to the above-described embodiment. FIG. 10 is a cross-sectional side view illustrating a configuration of the image formation device 100.

The image formation device 100 is provided with a sheet feeding and transport section 114 which feeds and transports the sheets 12 on the upstream side in the transport direction of the sheet 12 (cut sheets in this example of the drawing). The following components are provided on the downstream side of the sheet feeding and transport section 114 in the transport direction of the sheet 12: a treatment liquid application section 116 which applies a treatment liquid on a recording surface (hereinafter referred to as an image formation surface) of the sheet 12; an image formation section 118 which forms an image by adhering the liquid droplets 18 (refer to FIG. 1) of ink onto the image formation surface, an ink drying section 120 which dries ink of a treatment liquid layer formed on the sheet 12; an image fixing section 122 which fixes the image of the treatment liquid layer to the sheet 12; and a discharge section 124 which discharges the sheet 12 to which the image is fixed.

The sheet feeding and transport section 114 includes a stacking portion 126 which is provided so as to stack the sheets 12, a sheet feeding portion 128 which feeds the sheets 12 stacked on the stacking portion 126 one by one, and a transport portion 130 which transports the sheet 12 fed by the sheet feeding portion 128 to the treatment liquid application section 116.

The treatment liquid application section 116 includes a treatment liquid application drum 132 which is rotatably provided, a treatment liquid application device 134 which applies a treatment liquid on the image formation surface of the sheet 12, and a treatment liquid drying device 136 which dries the treatment liquid. Thereby, a thin treatment liquid layer is applied on the image formation surface of the sheet 12.

A first intermediate transport drum 138, which is rotatably provided, is disposed between the treatment liquid application section 116 and the image formation section 118. The first intermediate transport drum 138 is rotated in a state in which the sheet 12 is held on the surface of the first intermediate transport drum 138, and thus the sheet 12 supplied from the treatment liquid application section 116 side is transported to the image formation section 118 side.

The image formation section 118 includes an image formation drum 140 (transport portion) which is rotatably provided, and a head unit 142 which ejects the liquid droplets onto the sheet 12 transported by the image formation drum 140. The head unit 142 includes the recording heads 16 of at least Y (yellow), M (magenta), C (cyan), and K (black) which are primary colors. In addition, the respective recording heads 16 are line heads arranged along the circumferential direction of the image formation drum 140. Thereby, images of the respective colors are sequentially formed on the treatment liquid layer applied on the image formation surface of the sheet 12. Further, the treatment liquid has an effect of condensing color materials (pigments) and latex particles dispersed in a solvent of the ink, and is thus able to prevent the color materials from flowing on the sheet 12.

A second intermediate transport drum 146, which is rotatably provided, is disposed between the image formation section 118 and the ink drying section 120. The second intermediate transport drum 146 is rotated in a state in which the sheet 12 is held on the surface of the second intermediate transport drum 146, and thus the sheet 12 supplied from the image formation section 118 side is transported to the ink drying section 120 side.

The ink drying section 120 includes an ink drying drum 148 which is rotatably provided, and a plurality of hot air nozzles 150 and a plurality of infrared heaters (heaters 152) which dry the treatment liquid layer of the sheet 12. With such a configuration, the solvent of the ink, which stays in the treatment liquid layer of the sheet 12, is dried.

A third intermediate transport drum 154, which is rotatably provided, is disposed between the ink drying section 120 and the image fixing section 122. The third intermediate transport drum 154 is rotated in a state in which the sheet 12 is held on the surface of the third intermediate transport drum 154, and thus the sheet 12 supplied from the ink drying section 120 side is transported to the image fixing section 122 side.

The image fixing section 122 includes an image fixing drum 156 which is rotatably provided, a heating roller 158 which is disposed so as to be close to the surface of the image fixing drum 156, and a fixing roller 160 which is disposed in a state where the roller is pressed in contact with the surface of the image fixing drum 156. Therefore, the latex particles condensed in the treatment liquid layer are heated and pressed so as to be melted, and are thus fixed as an image onto the sheet 12.

The sheet 12, onto which the image of the image formation surface is fixed through the above-described respective steps, is transported to the discharge section 124 side provided on the downstream side of the image fixing section 122 through rotation of the image fixing drum 156.

[Description of Control System of Image Formation Device 100]

Figure 11:
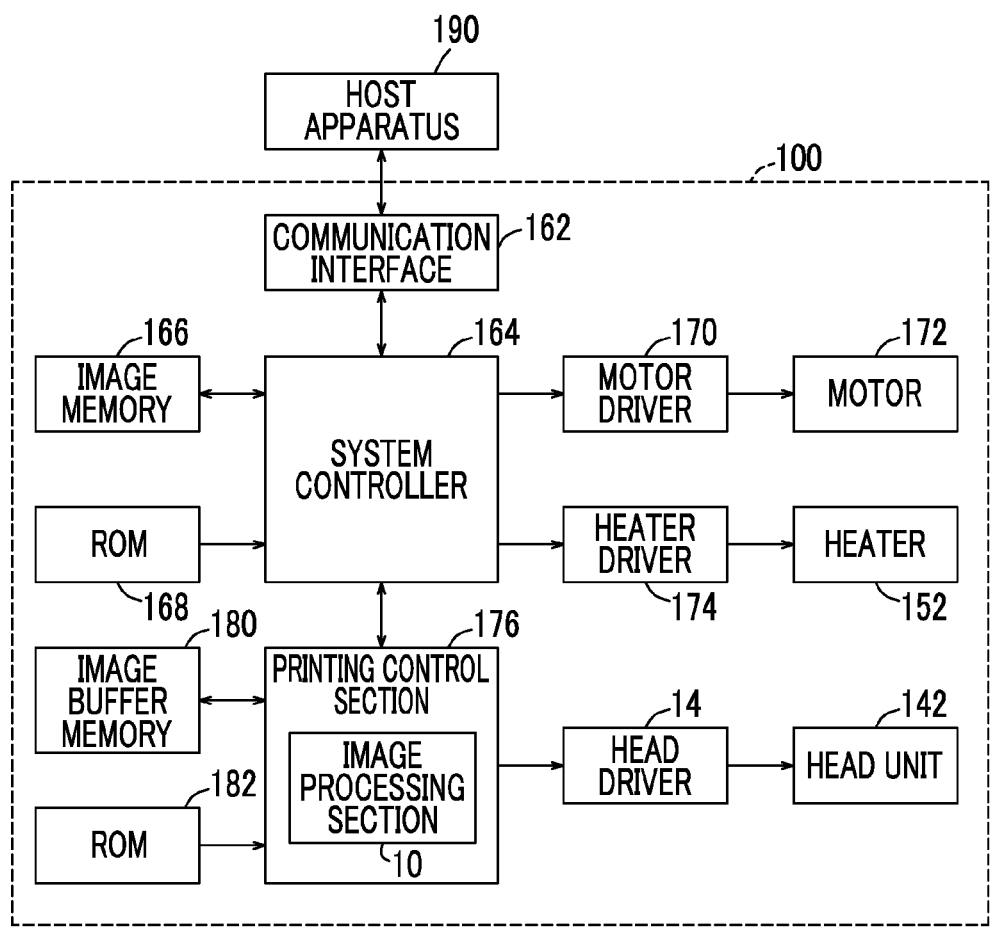
FIG. 11 is an electrical block diagram illustrating a system configuration of the image formation device illustrated in FIG. 10.

FIG. 11 is an electrical block diagram illustrating a system configuration of the image formation device 100 illustrated in FIG. 10. The image formation device 100 includes not only the head driver 14 (refer to FIG. 1), the head unit 142, and the heaters 152 (refer to FIG. 10 with regard to both of the two), but also a communication interface 162, a system controller 164, an image memory 166, a ROM 168, a motor driver 170, a motor 172, a heater driver 174, a printing control section 176 (including the image processing section 10 of FIG. 1), an image buffer memory 180, and a ROM 182.

The communication interface 162 is a section which interfaces with a host apparatus 190, and is used for a user to instruct the image formation device 100 to form an image or the like. The communication interface 162 may employ a serial interface such as a universal serial bus (USB), IEEE1394, Ethernet (registered trademark), or a wireless network, or a parallel interface such as Centronics. A buffer memory, which is not illustrated, for speeding up communication may be mounted in this section.

An image signal, which is sent from the host apparatus 190, is received by the image formation device 100 through the communication interface 162, and is temporarily stored in the image memory 166. The image memory 166 is storage means for storing an image signal input through the communication interface 162, and reads and writes information through the system controller 164. The image memory 166 is not limited to a memory formed by semiconductor elements, and may use a magnetic medium such as a hard disk.

The system controller 164 includes a central processing unit (CPU) and peripheral circuits. The system controller 164 functions as a control device that controls the overall image formation device 100 in accordance with a predetermined program, and functions as a calculation device that performs various calculations. In other words, the system controller 164 controls the respective sections such as the communication interface 162, the image memory 166, the motor driver 170, and the heater driver 174. Further, the system controller 164 performs communication control with the host apparatus 190, reading and writing control of the image memory 166 and the ROM 168, and the like. Furthermore, the system controller 164 generates control signals for controlling the motor 172 and the heaters 152 of the sheet transport system. In addition, an image signal stored in the image memory 166 as well as the control signal is transmitted to the printing control section 176.

The ROM 168 stores programs, which are executed by the CPU of the system controller 164, and a variety of data which is necessary for control. The image memory 166 is used as a temporary storage region of an image signal and is used as a development region of a program and a calculation work region of the CPU.

The motor driver 170 is a driver (driving circuit) which drives the motor 172 of the sheet transport system in accordance with an instruction from the system controller 164. The heater driver 174 is a driver which drives the heaters 152 in accordance with an instruction from the system controller 164.

The printing control section 176 includes a CPU and peripheral circuits, and performs processes such as correction and various processings for generating an ejection control signal from the image signal within the image memory 166 under the control of the system controller 164. The image processing section 10 performs image processing including halftone processing on the input image signal, thereby generating a dot image signal, which indicates dot formation positions (ink ejection timing), for each color plate.

The printing control section 176 has an ink ejection data generation function of generating ink ejection data (a control signal of the actuators corresponding to the nozzles of the head unit 142) on the basis of the dot image signal, which is generated by the image processing section 10, and a driving waveform generation function of generating driving signal waveforms for driving the actuators corresponding to the nozzles of the head unit 142.

The signal (driving waveform) generated in the printing control section 176 is supplied to the head driver 14 so as to control an ink ejection operation of the head unit 142. That is, the head driver 14 controls the head unit 142 such that it sequentially forms dots in a state where the sheet 12 is moved relative to the head unit 142.

The printing control section 176 includes the image buffer memory 180, and an image signal or data such as parameters is temporarily stored in the image buffer memory 180 when the printing control section 176 processes the image signal.

The printing control section 176 is connected to the ROM 182 which stores programs executed by the CPU of the printing control section 176 and a variety of data which is necessary for control. The ROM 182 may be read only storage means, but preferably utilizes rewritable storage means such as an EEPROM in a case where a variety of data is updated as necessary.

It should be noted that, in FIG. 11, the image processing section 10 is included in the printing control section 176. For example, the image processing section 10 may be formed separately from the printing control section 176 or the system controller 164.

It should be noted that the present invention is not limited to the above-described embodiment, and can be freely modified without departing from the scope of the invention.

For example, various types of a mechanism for ejecting the liquid droplets through the recording head 16 may be employed. A type ejecting liquid droplets of ink through deformation of actuators formed by for example piezoelectric elements or the like may be employed. Further, a thermal jet type may be employed in which a heating element such as a heater heats ink so as to generate bubbles and the liquid droplets are ejected by a pressure thereof. The recording head 16 is not limited to a line head, and may be a multi-pass type which forms an image while reciprocating and scanning in the width direction of the sheet 12.

In the above-described embodiment, the ink-jet-type image formation device is exemplified, but the present invention is not limited to this. Thus, the present invention can be applied to any type (for example, an electrophotographic type) which forms dots on a recording medium.

In the above-described embodiment, a wide format printing apparatus is exemplified, but the scope of the present invention is not limited to this. It may be possible to apply the present invention to image formation devices other than the wide format printing apparatus. Further, the present invention is not limited to the graphic art (printing) application. The present invention can be applied to various image formation devices capable of forming an image pattern, such as a wire drawing apparatus of an electronic circuit board, a manufacturing device of various devices, a resist printing apparatus using a resin liquid as a functional liquid for ejection, and a micro-structure forming apparatus.

What is claimed is:

1. An image formation device that forms an image which is formed of dots with a plurality of dot sizes, the image formation device comprising:
   a combination selection portion that selects two or more combinations among combinations of a plurality of types of threshold matrix for performing binarization processing on a continuous tone image signal and at least one type of division information for classifying a whole range of threshold values covered by the types of threshold matrix into a plurality of divisions;
   a code assigning portion that respectively assigns code values, which are based on whether or not pixels of the continuous tone image signal belong to the plurality of divisions, to the two or more combinations; and
   a dot size determination portion that determines the dot sizes of the respective pixels on the basis of the two or more code values respectively corresponding to the two or more combinations.

2. The image formation device according to claim 1, further comprising
   a data storage portion that stores size correspondence information which indicates a correspondence relationship between the dot sizes and the combination codes in which the two or more code values are combined in accordance with combination rules,
   wherein the dot size determination portion generates the combination codes, and determines the dot sizes by referring to the size correspondence information which is stored by the data storage portion.

3. The image formation device according to claim 2, wherein the combination selection portion selects the two or more combinations in accordance with a gray level indicated by the continuous tone image signal.

4. The image formation device according to claim 3, wherein the combination selection portion selects two or more types of threshold matrix, which have the same matrix size, as combinations.

5. The image formation device according to claim 3, further comprising:
   a recording head that forms dots with a plurality of dot sizes on a recording medium; and
   a head driving circuit that controls the recording head such that the recording head sequentially forms the dots, on the basis of a control signal corresponding to the dot sizes determined by the dot size determination portion, under a condition where the recording medium is moved relative to the recording head.

6. The image formation device according to claim 2, wherein the combination selection portion selects two or more types of threshold matrix, which have the same matrix size, as combinations.

7. The image formation device according to claim 2, further comprising:
   a recording head that forms dots with a plurality of dot sizes on a recording medium; and
   a head driving circuit that controls the recording head such that the recording head sequentially forms the dots, on the basis of a control signal corresponding to the dot sizes determined by the dot size determination portion, under a condition where the recording medium is moved relative to the recording head.

8. The image formation device according to claim 1, wherein the combination selection portion selects the two or more combinations in accordance with a gray level indicated by the continuous tone image signal.

9. The image formation device according to claim 8, wherein the combination selection portion selects two or more types of threshold matrix, which have the same matrix size, as combinations.

10. The image formation device according to claim 8, further comprising:
a recording head that forms dots with a plurality of dot sizes on a recording medium; and
a head driving circuit that controls the recording head such that the recording head sequentially forms the dots, on the basis of a control signal corresponding to the dot sizes determined by the dot size determination portion, under a condition where the recording medium is moved relative to the recording head.

11. The image formation device according to claim 1, wherein the combination selection portion selects two or more types of threshold matrix, which have the same matrix size, as combinations.

12. The image formation device according to claim 11, wherein the combination selection portion selects two or more types of threshold matrix, which have the same arrangement in a part of a range of the threshold values, as combinations.

13. The image formation device according to claim 11, further comprising:
a recording head that forms dots with a plurality of dot sizes on a recording medium; and
a head driving circuit that controls the recording head such that the recording head sequentially forms the dots, on the basis of a control signal corresponding to the dot sizes determined by the dot size determination portion, under a condition where the recording medium is moved relative to the recording head.

14. The image formation device according to claim 1, further comprising:
a recording head that forms dots with a plurality of dot sizes on a recording medium; and
a head driving circuit that controls the recording head such that the recording head sequentially forms the dots, on the basis of a control signal corresponding to the dot sizes determined by the dot size determination portion, under a condition where the recording medium is moved relative to the recording head.

15. An image formation method for using the image formation device according to claim 1 that forms an image which is formed of dots with a plurality of dot sizes, the image formation method comprising:
selecting two or more combinations among combinations of a plurality of types of threshold matrix for performing binarization processing on a continuous tone image signal and at least one type of division information for classifying a whole range of threshold values covered by the types of threshold matrix into a plurality of divisions;
assigning respectively code values, which are based on whether or not pixels of the continuous tone image signal belong to the plurality of divisions, to the two or more combinations; and
determining the dot sizes of the respective pixels on the basis of the two or more code values respectively corresponding to the two or more combinations.

16. A non-transitory recording medium storing a program for causing the image formation device according to claim 1, which forms an image formed of dots with a plurality of dot sizes, to execute:
selecting two or more combinations among combinations of a plurality of types of threshold matrix for performing binarization processing on a continuous tone image signal and at least one type of division information for classifying a whole range of threshold values covered by the types of threshold matrix into a plurality of divisions;
assigning respectively code values, which are based on whether or not pixels of the continuous tone image signal belong to the plurality of divisions, to the two or more combinations; and
determining the dot sizes of the respective pixels on the basis of the two or more code values respectively corresponding to the two or more combinations.

\* \* \* \* \*